United States Patent
Liu et al.

(10) Patent No.: US 11,325,864 B2
(45) Date of Patent: May 10, 2022

(54) HIGH TOUGHNESS INORGANIC COMPOSITE ARTIFICIAL STONE PANEL AND PREPARATION METHOD THEREOF

(71) Applicants: Heming Huang, Shenzhen (CN); Fucai Liu, Xiamen (CN)

(72) Inventors: Fucai Liu, Xiamen (CN); Min Xiao, Huizhou (CN); Bin Li, Huizhou (CN); Zengyong Zheng, Huizhou (CN); Heming Huang, Shenzhen (CN)

(73) Assignees: Heming Huang, Shenzhen (CN); Fucai Liu, Xiamen (CN)

( * ) Notice: Subject to any disclaimer, the term of this patent is extended or adjusted under 35 U.S.C. 154(b) by 0 days.

(21) Appl. No.: 16/926,796

(22) Filed: Jul. 13, 2020

(65) Prior Publication Data

US 2021/0017079 A1   Jan. 21, 2021

(30) Foreign Application Priority Data

Jul. 19, 2019 (CN) .......................... 201910657352.7

(51) Int. Cl.
*B32B 13/02* (2006.01)
*B32B 13/04* (2006.01)
(Continued)

(52) U.S. Cl.
CPC .............. *C04B 28/04* (2013.01); *B28B 1/523* (2013.01); *B28B 3/006* (2013.01); *B28B 3/022* (2013.01);
(Continued)

(58) Field of Classification Search
CPC ...... B32B 13/02; B32B 13/04; B32B 2315/06; B32B 2318/04; B32B 2607/00;
(Continued)

(56) References Cited

U.S. PATENT DOCUMENTS 3,949,144 A * 4/1976 Duff .......................... E04C 2/26
                                                    428/414
4,588,443 A * 5/1986 Bache .................. C04B 18/146
                                                    106/644
(Continued)

FOREIGN PATENT DOCUMENTS

CN         1084806 A       4/1994
CN         2180455 Y      10/1994
(Continued)

*Primary Examiner* — Joanna Pleszczynska

(74) *Attorney, Agent, or Firm* — Bayramoglu Law Offices LLC

(57) ABSTRACT

A high toughness inorganic composite artificial stone panel and preparation method are disclosed. The panel includes a surface layer, an intermediate metal fiber toughening layer and a substrate toughening layer. The surface layer includes the following components: 40-70 parts of quartz sand, 10-30 parts of quartz powder, 20-45 parts of inorganic active powder, 0.5-4 parts of pigment, 0.3-1 part of water reducer and 3-10 parts of water. The intermediate metal fiber toughening layer includes the following components: 40-60 parts of inorganic active powder, 45-65 parts of sand, 0.8-1.5 parts of water reducer, 6-14 parts of water and 4-8 parts of metal fiber. The substrate toughening layer includes the following components: 30-50 parts of inorganic active powder, 30-55 parts of quartz sand, 15-20 parts of quartz powder, 0.5-1.2 parts of water reducer, 4-8 parts of water and 0.8-2.5 parts of toughening agent.

13 Claims, 1 Drawing Sheet

(51) Int. Cl.
  *C04B 14/06* (2006.01)
  *C04B 14/48* (2006.01)
  *B28B 1/52* (2006.01)
  *B28B 3/00* (2006.01)
  *B28B 3/02* (2006.01)
  *B32B 37/10* (2006.01)
  *C04B 28/04* (2006.01)
  *B32B 37/24* (2006.01)
  *C04B 24/26* (2006.01)
  *C04B 103/30* (2006.01)
  *C04B 111/00* (2006.01)

(52) U.S. Cl.
  CPC .............. *B32B 13/02* (2013.01); *B32B 13/04* (2013.01); *B32B 37/1018* (2013.01); *B32B 37/1045* (2013.01); *B32B 37/24* (2013.01); *C04B 14/06* (2013.01); *C04B 14/068* (2013.01); *C04B 14/48* (2013.01); *C04B 24/2623* (2013.01); *C04B 24/2652* (2013.01); *B32B 2262/103* (2013.01); *B32B 2307/558* (2013.01); *B32B 2310/028* (2013.01); *B32B 2315/06* (2013.01); *B32B 2318/04* (2013.01); *B32B 2607/00* (2013.01); *C04B 2103/302* (2013.01); *C04B 2111/00612* (2013.01)

(58) Field of Classification Search
  CPC .... E04C 2/04; E04C 2/26; C04B 2111/00612; C04B 14/06
  See application file for complete search history.

(56) References Cited

U.S. PATENT DOCUMENTS

| | | | | |
|---|---|---|---|---|
| 6,080,234 A | * | 6/2000 | Clavaud | F41H 5/02 106/644 |
| 7,494,543 B2 | * | 2/2009 | Hughes | C04B 28/02 106/644 |
| 2012/0322921 A1 | * | 12/2012 | Bracegirdle | C08F 216/06 524/5 |
| 2013/0071633 A1 | | 3/2013 | Aravamudan | |

FOREIGN PATENT DOCUMENTS

| | | |
|---|---|---|
| CN | 105601190 A | 5/2016 |
| CN | 106630805 A | 5/2017 |
| CN | 109138310 A | 1/2019 |
| CN | 109184117 A | 1/2019 |
| CN | 109354468 A | 2/2019 |
| JP | 2009184173 A | 8/2009 |

* cited by examiner

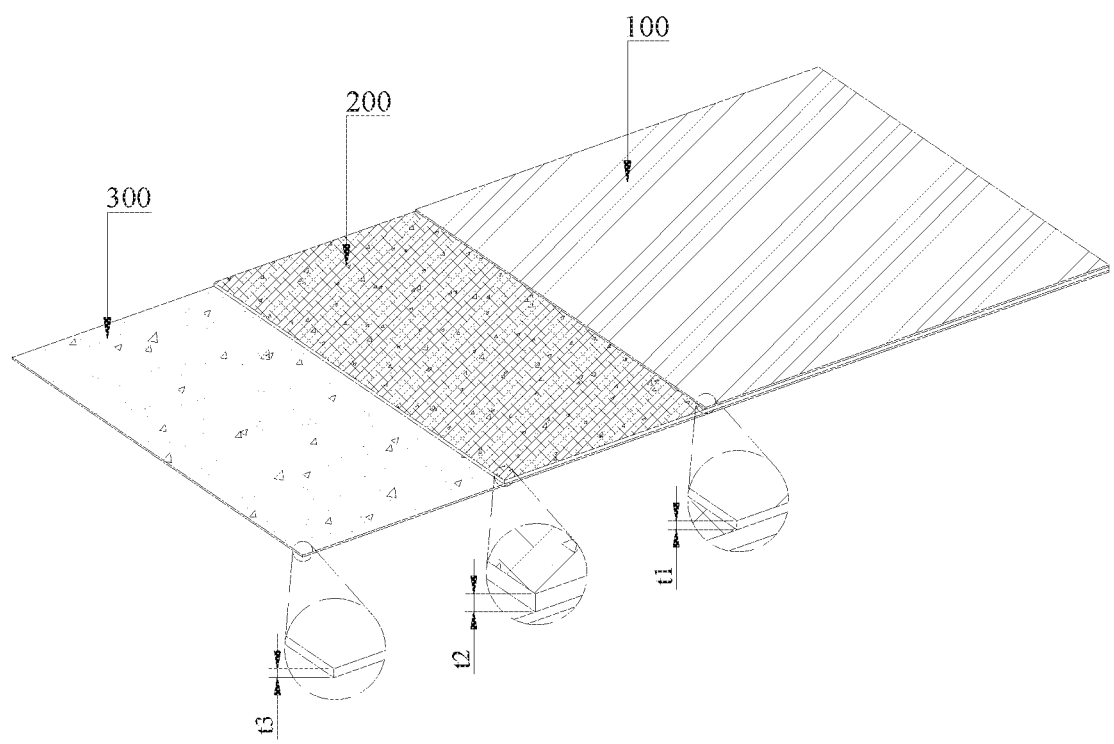

HIGH TOUGHNESS INORGANIC COMPOSITE ARTIFICIAL STONE PANEL AND PREPARATION METHOD THEREOF

CROSS REFERENCE TO THE RELATED APPLICATIONS

This application is based upon and claims priority to Chinese Patent Application No. 201910657352.7, filed on Jul. 19, 2019, the entire contents of which are incorporated herein by reference.

TECHNICAL FIELD

The present invention relates to the technical field of processing artificial stones, and more particularly, relates to a high toughness inorganic composite artificial stone panel and preparation method thereof.

BACKGROUND

As the country strengthens ecological and environmental protection, exploitation of natural stone mines is strictly controlled. China's infrastructure construction, such as airports, subway stations, high-speed rail stations, commercial plaza and hall centers, however, is aggressively developing. A large amount of artificial stone panel materials are required as a result. The artificial stone that replaces the natural stone has broad market prospects.

Traditional artificial stone is typically composed of organic resin and smaller amounts of inorganic material. The resin artificial stone has several disadvantages. In addition to deformation and cracking due to heating, exposure to ultraviolet radiation and elevated temperatures weaken the strength and cause aging and discoloration. Moreover, the resin artificial stone may produce an unpleasant smell during combustion, be hardly degraded and have short service life. Therefore, use of the resin artificial stone has been gradually restricted because of the potential harm it may cause to the environment. Currently, novel inorganic artificial stone panels are mainly traditional cement-based terrazzo products, which have numerous shortcomings, including low compressive strength, poor hardness, poor bending strength, brittle, high overall water absorption rate and poor resistance to pollution and chemical performance. Thus, novel inorganic artificial stone panels possess undesirable physical and mechanical properties compared to the natural stones.

The current inorganic artificial stone is inherently brittle and easily broken when put under pressure. Artificial stone panel typically has a single-layer structure, and the bottom is directly cracked to produce brittle fracture when suffering from an external force. The structure's low ductility directly leads to product damage. In this regard, a metal mesh or fiber mesh reinforced structure, such as that disclosed in CN106630805A, may be added to the middle of the structure locally to reinforce it. The brittle bottom, however, still bends and deforms to produce brittle cracks due to the applied force. Although the reinforced mesh improves tensile strength and relieves formation of cracks to some extent, as applied force increases, the structure eventually succumbs to deformation, crack propagation and destruction. Another structure disclosed in CN109354468A uses a toughening plate formed by combining a surface layer with a direct fiber substrate to solve the problem of deformation and cracks of the surface layer due to compression. The introduction of fiber substrate, however, causes fiber exposure out of the surface and forms fiber channel hole in the bottom scraping during manufacture of the artificial stone panel, which results in unwanted increases in water absorption for the panel structure. If metal fiber is used, corrosion damage and metal corrosion pollution phenomenon may be induced. If other fiber is used, the unwanted increase in water absorption rate may appear, which has a deleterious effect on the mechanical properties and durability of the panel.

SUMMARY

In view of this, the present invention provides a high toughness inorganic composite artificial stone panel having a multilayer composite structure, which shows high strength, pollution resistance, high toughness, long service life, aging resistance and economic rationality.

According to the present invention, the high toughness inorganic composite artificial stone panel includes: a surface layer, an intermediate metal fiber toughening layer and a substrate toughening layer. The surface layer includes the following raw material components in parts by weight: 40-70 parts of quartz sand, 10-30 parts of quartz powder, 20-45 parts of inorganic active powder, 0.5-4 parts of pigment, 0.3-1 part of water reducer and 3-10 parts of water. The intermediate metal fiber toughening layer includes the following raw material components in parts by weight: 40-60 parts of inorganic active powder, 45-65 parts of sand, 0.8-1.5 parts of water reducer, 6-14 parts of water and 4-8 parts of metal fiber. The substrate toughening layer includes the following raw material components in parts by weight: 30-50 parts of inorganic active powder, 30-55 parts of quartz sand, 15-20 parts of quartz powder, 0.5-1.2 parts of water reducer, 4-8 parts of water and 0.8-2.5 parts of toughening agent.

Further, the quartz sand has a fineness modulus of 2.0-3.0, a content of silicon dioxide above 93% and a hardness of a raw stone above 7 and is free of impurities and weathering.

Further, the quartz powder has a fineness of 600 mesh or more, a content of silicon dioxide above 93%, a hardness of a raw stone above 7. In the present invention, a core function of the quartz powder lies in improving abrasion resistance and scratch resistance of hydration products of cementitious powder except for aggregate on a surface of the artificial stone after mixing, and improving a surface density.

Further, the inorganic active powder is mainly composed of pure white Portland cement having a strength grade of more than 42.5 doped with one or more active powders selected from the group consisting of white silicon powder, mineral powder, nano calcium oxide, nano silicon oxide, and sintered high white kaolin powder. The color of the active powder is simply white with a whiteness index exceeding 80, and an activity index is detected to be greater than 100%. This ensures the good stability of subsequent color regulation while keeping material strength. A ratio of cement to other active powder is 1:0.2-0.6

Further, the pigments are inorganic pigments of various colors.

Further, the water reducer does not have a metal ion color, the concentration of the water reducer is no more than 20%, a water reduction rate of the water reducer is more than 20%, and the retarding time is 0.5-1 hour.

Further, the sand is one or more selected from the group consisting of river sand, manufactured sand and quartz sand, is required to exclude mud, mud block and organic shellfish, and has material firmness quality loss of not greater than 8%, a maximum particle diameter of not greater than 2.5 mm, and a fineness modulus of less than 3.0 and greater than 2.0.

Further, the metal fiber includes one or more of metal fibers having a diameter range of 0.1-0.2 mm, an aspect ratio of 50-150, and a tensile strength of greater than 1000 MPa.

Further, the toughening agent is one or more of latexes such as polyvinyl alcohol glue, acrylamide glue and so on.

Further, an overall thickness of the panel is 15-50 mm, a thickness of the surface layer is 3-5 mm, and a thickness of the substrate layer is 3-5 mm.

The present invention further provides a preparation method of the high toughness inorganic composite artificial stone panel, including the following steps:

S1. stirring and mixing raw materials respectively used for the surface layer, the intermediate metal fiber toughening layer and the substrate toughening layer uniformly according to the above predetermined ratio to obtain mixed materials of respective layers for use;

S2. preparing a panel mold, calculating and weighing the mixed material of the surface layer prepared in step S1 according to the thickness and uniformly arranging the mixed material in the panel mold, calculating and weighing the mixed material of the intermediate metal fiber toughening layer prepared in step S1 according to the thickness and uniformly arranging the mixed material on the mixed material of the surface layer in the panel mold, and then calculating and weighing the mixed material of the substrate toughening layer prepared in step S1 according to the thickness and uniformly arranging the mixed material on the mixed material of the intermediate metal fiber toughening layer in the panel mold;

S3. covering an isolation moisturizing film on the mixed material of the substrate toughening layer in the panel mold of step S2, and then putting into a vacuum-press to concurrently perform a vacuum exhaust and a vibrating compression;

S4. curing the plate compressed in step S3 at a temperature of 40'C for 6-8 hours, then heating to 80-90° C. after demolding and curing for 12-16 hours to obtain a rough plate; and S5. performing a bottom scraping, thickening and polishing on the rough plate obtained in step S4 after removing the isolation moisturizing film to obtain the high toughness inorganic composite artificial stone panel.

Further, in step 1, the stirring time and the mixing time are not less than 10 minutes, respectively, and Vebe consistometer test time of working performance of the stirring material is 5-30 seconds; and initial setting time after the stirring and mixing is not less than 60 minutes.

Further, in step S3, and the time for the vacuum exhaust is not less than 60 seconds, the time for the compression is not less than 120 seconds; and a vacuum pressure is −0.07-0.1 MPa, a pressure load of the vacuum-press is not less than 1 MPa, and a pressure is not less than 5000 kN.

Further, in step S4, humidity is kept above 75% during the high temperature curing process.

The process performs centralized pressing by a continuously hierarchical material arrangement manner to make materials between layers intermesh with each other so as to avoid an interface separation phenomenon under compression. Compared to conventional vacuum process of preparing inorganic stone, pressing pressure is increased and vacuuming time is shortened, compactness and production efficiency of artificial stone are improved, water absorption rate of a panel surface is reduced. The volume of artificial stone panel becomes more stable while improving use efficiency of mold in early stage by staged curing through adjusting temperature and preserving moisture, and completely overcomes shrinkage performance to ensure stable consistency of strength throughout the life of the panel.

According to the present invention, the high toughness composite artificial stone panel has advantages of high strength, high bending resistance, low brittleness, impact resistance, crack resistance and good aseismic performance. Moreover, the volume is stable with low shrinkage, no warping deformation occurs during use, the water absorption is extremely low, the durability is good and no aging issues exist. The various layers are firmly bonded. The structure is highly safe with good ductility and, therefore, has no instant brittle fracture. The structure is able to be used as a bearing structure with good surface pollution resistance. The structure has a wide material resource, a low overall and comprehensive construction cost, and is suitable for promotion and use.

BRIEF DESCRIPTION OF THE DRAWINGS

FIGURE is a schematic diagram showing a structure of a high toughness inorganic composite artificial stone panel.

Illustration of reference signs: surface layer 100, intermediate metal fiber toughening layer 200, and substrate toughening layer 300.

DETAILED DESCRIPTION OF THE EMBODIMENTS

The drawings are for illustrative purposes only and cannot be construed as limitations to the invention. In order to better explain the present embodiment, some parts in the drawings may be omitted, enlarged or shrunk, and do not represent a size of an actual product. To those skilled in the art, it may be understandable that some well-known structures in the drawings and the description thereof may be omitted. The positional relationship described in the drawings is only for illustrative purposes and cannot be construed as limitations to the invention. Below the present invention will be further explained in detail in conjunction with exemplary embodiments.

Embodiment 1

As shown in the FIGURE, a high toughness inorganic composite artificial stone panel having an overall thickness (t1+t2+t3) of 15-50 mm, includes a surface layer having a thickness t1 of 3-5 mm, an intermediate metal fiber toughening layer t2 and a substrate toughening layer having a thickness t3 of 3-5 mm. The surface layer includes the following raw material components in parts by weight: 40 parts of quartz sand, 10 parts of quartz powder, 20 parts of inorganic active powder, 0.5 parts of pigment, 0.3 parts of water reducer, and 3 parts of water. The intermediate metal fiber toughening layer includes the following raw material components in parts by weight: 40 parts of inorganic active powder, 45 parts of sand, 0.8 parts of water reducer, 6 parts of water, and 4 parts of metal fiber. The substrate toughening layer includes the following raw material components in parts by weight: 30 parts of inorganic active powder, 30 parts of quartz sand, 15 parts of quartz powder, 0.5 parts of water reducer, 4 parts of water, and 0.8 parts of toughening agent.

Specifically, the quartz sand has a fineness modulus of 2.3 (the fineness modulus of the quartz sand may be 2.0-3.0, and the present embodiment selects to use 2.3), a content of silicon dioxide above 93% and a hardness of a raw stone above 7, and is free of impurities and weathering.

The quartz powder has a fineness of more than 600 mesh, a content of silicon dioxide above 93% and a hardness of a raw stone above 7.

The inorganic active powder is mainly composed of P.O42.5 white cement doped with white silicon powder. However, it should be appreciated that one or more active powders selected from the group consisting of, mineral powder, nano calcium oxide, nano silicon oxide and sintered high white kaolin powder can be doped.

The pigment is inorganic pigments of various colors.

The water reducer does not have a metal ion color, the concentration of the water reducer is no more than 20%, the water reduction rate of the water reducer is more than 20%, and the retarding time is 0.5-1 hour.

The sand is river sand which excludes mud, mud block and organic shellfish, and has material firmness quality loss of not greater than 8%, a maximum particle diameter of not greater than 2.5 mm and a fineness modulus of 2.6. However, the sand can be one or more selected from the group consisting of river sand, manufactured sand, and quartz sand.

The metal fiber has a diameter of 0.1 mm, an aspect ratio of 100 and a tensile strength of greater than 1000 MPa. However, the mental fiber may be one or more of metal fibers having a diameter range of 0.1-0.2 mm, an aspect ratio of 50-150 and a tensile strength of greater than 1000 MPa.

The toughening agent is polyvinyl alcohol glue and acrylamide glue.

The high toughness inorganic composite artificial stone panel is manufactured according to the following steps:

S1. stirring and mixing raw materials respectively used for the surface layer, the intermediate metal fiber toughening layer and the substrate toughening layer according to the predetermined ratio to obtain mixed materials of respective layers for use, wherein the stirring and mixing for the surface layer, the intermediate metal fiber toughening layer and the substrate toughening layer last for more than 10 minutes, respectively, Vebe consistometer test time of mixed materials of respective layers is 5-30 seconds, and initial setting time of mixed materials of respective layers after the stirring and mixing is not less than 60 minutes;

S2. preparing a panel mold, calculating and weighing the mixed material of the surface layer prepared in step S according to the thickness and uniformly arranging the mixed material in the panel mold, calculating and weighing the mixed material of the intermediate metal fiber toughening layer prepared in step S1 according to the thickness and uniformly arranging the mixed material on the mixed material of the surface layer in the panel mold, and then calculating and weighing the mixed material of the substrate toughening layer prepared in step S1 according to the thickness and uniformly arranging the mixed material on the mixed material of the intermediate toughening layer in the panel mold;

S3. covering an isolation moisturizing film on the mixed material of the substrate toughening layer in the panel mold of step S2, and then putting into a vacuum-press to concurrently perform a vacuum exhaust and a vibrating compression, wherein vacuuming time is not less than 60 seconds, compressing time is not less than 120 seconds; and a vacuum pressure is −0.07-0.1 MPa, a pressure load of the vacuum-press is not less than 1 MPa, and a pressure is not less than 5000 kN;

S4. curing the plate compressed in step S3 at a temperature of 40'C for 6-8 hours, then heating to 80-90° C. after demolding and curing for 12-16 hours to obtain a rough plate, wherein the humidity is kept above 75% during the high temperature curing process; and S5. performing a bottom scraping, thickening and polishing on the rough plate obtained in step S4 after removing the isolation moisturizing film to obtain the high toughness inorganic composite artificial stone panel.

Embodiment 2

Except that the formula of the high toughness inorganic composite artificial stone panel is different, other conditions are the same as those in Embodiment 1.

A high toughness inorganic composite artificial stone panel includes: a surface layer including the following raw material components in parts by weight: 70 parts of quartz sand, 30 parts of quartz powder, 45 parts of inorganic active powder, 4 parts of pigment, 1 part of water reducer and 10 parts of water; an intermediate metal fiber toughening layer including the following raw material components in parts by weight: 60 parts of inorganic active powder, 65 parts of sand, 1.5 parts of water reducer, 14 parts of water and 8 parts of metal fiber; and a substrate toughening layer including the following raw material components in parts by weight: 50 parts of inorganic active powder, 55 parts of quartz sand, 20 parts of quartz powder, 1.2 parts of water reducer, 8 parts of water and 2.5 parts of toughening agent.

Embodiment 3

Except that the formula of the high toughness inorganic composite artificial stone panel is different, other conditions are the same as those in Embodiment 1.

A high toughness inorganic composite artificial stone panel includes: a surface layer including the following raw material components in parts by weight: 50 parts of quartz sand, 15 parts of quartz powder, 27 parts of inorganic active powder, 1.5 parts of pigment, 0.5 part of water reducer and 4.5 parts of water; an intermediate metal fiber toughening layer including the following raw material components in parts by weight: 45 parts of inorganic active powder, 50 parts of sand, 0.9 part of water reducer, 8 parts of water and 5 parts of metal fiber; and a substrate toughening layer including the following raw material components in parts by weight: 35 parts of inorganic active powder, 36 parts of quartz sand, 16 parts of quartz powder, 0.65 part of water reducer, 5 parts of water and 1.2 parts of toughening agent.

Embodiment 4

Except that the formula of the high toughness inorganic composite artificial stone panel is different, other conditions are the same as those in Embodiment 1.

A high toughness inorganic composite artificial stone panel includes: a surface layer including the following raw material components in parts by weight: 60 parts of quartz sand, 25 parts of quartz powder, 38 parts of inorganic active powder, 3 parts of pigment, 0.8 parts of water reducer and 8.5 parts of water; an intermediate metal fiber toughening layer including the following raw material components in parts by weight: 55 parts of inorganic active powder, 60 parts of sand, 1.4 part of water reducer, 12 parts of water and 7 parts of metal fiber; and a substrate toughening layer including the following raw material components in parts by weight: 45 parts of inorganic active powder, 49 parts of quartz sand, 19 parts of quartz powder, 1.05 parts of water reducer, 7 parts of water and 2.1 parts of toughening agent.

Embodiment 5

Except that the formula of the high toughness inorganic composite artificial stone panel is different, other conditions are the same as those in Embodiment 1.

A high toughness inorganic composite artificial stone panel includes: a surface layer including the following raw material components in parts by weight: 55 parts of quartz sand, 20 parts of quartz powder, 32 parts of inorganic active powder, 2.3 parts of pigment, 0.65 parts of water reducer and 6.5 parts of water; an intermediate metal fiber toughening layer including the following raw material components in parts by weight: 50 parts of inorganic active powder, 55 parts of sand, 1.2 part of water reducer, 10 parts of water and 6 parts of metal fiber; and a substrate toughening layer including the following raw material components in parts by weight: 40 parts of inorganic active powder, 42.5 parts of quartz sand, 17.5 parts of quartz powder, 0.85 parts of water reducer, 6 parts of water and 1.65 parts of toughening agent.

Comparative Example 1

Except that the substrate layer does not contain toughening agent, others are the same as those in Embodiment 1.

Comparative Example 2

Except that the intermediate toughening layer does not contain metal fiber, others are the same as those in Embodiment 1.

Comparative Example 3

Common resin artificial stone.

The high toughness inorganic composite artificial stone panels prepared in the above Embodiments 1-5 and Comparative Examples 1-3 are manufactured as standard sample to perform performance tests. Test results are shown in Table 1:

TABLE 1

Performance Test Results of Inorganic Decorative Plate

| Items | Compressive Strength (MPa) | Bending Strength (MPa) | Impact Resistance | Moh's Hardness | Abrasion Resistance (mm³) | Stain Resistance (16 hours after dripping red wine, coffee, rice vinegar, soy sauce on a surface) |
|---|---|---|---|---|---|---|
| Embodiment 1 | 150.5 | 25.2 | No Damage | 7 | 131 | The surface can be scrubbed with a small amount of residual |
| Embodiment 2 | 154.1 | 26.5 | No Damage | 8 | 116 | The surface can be scrubbed with a small amount of residual |
| Embodiment 3 | 155.9 | 27.3 | No Damage | 7 | 123 | The surface can be scrubbed with a small amount of residual |
| Embodiment 4 | 157.5 | 28.1 | No Damage | 8 | 116 | The surface can be scrubbed with a small amount of residual |
| Embodiment 5 | 160.7 | 29.8 | No Damage | 8 | 102 | The surface can be scrubbed without residual |
| Comparative Example 1 | 132.1 | 17.9 | Damaged | 7 | 131 | The surface can be scrubbed with a small amount of residual |
| Comparative Example 2 | 135.6 | 15.2 | Damaged | 7 | 131 | The surface can be scrubbed with a small amount of residual |
| Comparative Example 3 | 80.9 | 16.5 | Damaged | 4 | 462 | The surface cannot be scrubbed |

It can be seen from Table 1 that, the substrate layer of Comparative Example 1 does not contain the toughening agent, and in comparison with Embodiment 1, the compressive strength, bending strength and impact resistance are all reduced and the Moh's hardness, abrasion resistance and stain-resistance are essentially the same. The intermediate layer of Comparative Example 2 does not contain the metal fiber, and in comparison with Embodiment 1, the compressive strength, bending strength and impact resistance are each reduced, and the Moh's hardness, abrasion resistance and stain resistance are essentially the same. Compared with Embodiment 1, the compressive strength, bending strength, impact resistance, Mob's hardness, abrasion resistance and stain resistance of the common resin artificial stone of Comparative Example 3 are each reduced.

Obviously, the above exemplary embodiments of the present invention are examples only for clearly illustrating the present invention, rather than limiting the embodiments of the present invention. For those ordinarily skilled in the art, other different forms of changes or variations may also be made based on the above description. Here, it is unnecessary to exhaustively list all embodiments. Any amendments, equivalent replacements and improvements made within the spirit and principle of the invention should be included in the protection scope of the present invention.

What is claimed is:

1. A high toughness inorganic composite artificial stone panel, comprising: a surface layer, an intermediate metal fiber toughening layer, and a substrate toughening layer; wherein
    the surface layer comprises the following raw material components in parts by weight: 40-70 parts of quartz sand, 10-30 parts of quartz powder, 20-45 parts of an inorganic active powder, 0.5-4 parts of a pigment, 0.3-1 part of a water reducer and 3-10 parts of water;
    the intermediate metal fiber toughening layer comprises the following raw material components in parts by weight: 40-60 parts of the inorganic active powder, 45-65 parts of sand, 0.8-1.5 parts of the water reducer, 6-14 parts of water and 4-8 parts of a metal fiber; and
    the substrate toughening layer comprises the following raw material components in parts by weight: 30-50 parts of the inorganic active powder, 30-55 parts of the quartz sand, 15-20 parts of the quartz powder, 0.5-1.2 parts of the water reducer, 4-8 parts of water and 0.8-2.5 parts of a toughening agent;
    wherein the quartz sand has a fineness modulus of 2.0-3.0, a content of silicon dioxide above 93% and a hardness of a raw stone above 7; and the quartz powder has a fineness of 600 mesh or more, a content of silicon dioxide above 93%, a hardness of a raw stone above 7.

2. The high toughness inorganic composite artificial stone panel of claim 1, wherein the inorganic active powder is mainly composed of pure white Portland cement doped with active powder, the pure white Portland cement has a strength grade of more than 42.5, and the active powder is at least one selected from the group consisting of white silicon powder, mineral powder, nano calcium oxide, nano silicon oxide, and sintered high white kaolin powder.

3. The high toughness inorganic composite artificial stone panel of claim 1, wherein the sand is at least one selected from the group consisting of river sand, manufactured sand, and the quartz sand.

4. The high toughness inorganic composite artificial stone panel of claim 1, wherein the toughening agent is at least one selected from the group consisting of polyvinyl alcohol glue and acrylamide glue.

5. The high toughness inorganic composite artificial stone panel of claim 1, wherein an overall thickness of the high toughness inorganic composite artificial stone panel is 15-50 mm, a thickness of the surface layer is 3-5 mm, and a thickness of the substrate toughening layer is 3-5 mm.

6. A preparation method of the high toughness inorganic composite artificial stone panel of claim 1, comprising the following steps:

S1) uniformly stirring and mixing first raw materials, second raw materials, and third raw materials, respectively, according to the predetermined ratio to obtain a first mixed material, a second mixed material, and a third mixed material, wherein the first raw materials are used for the surface layer, the second raw materials are used for the intermediate metal fiber toughening layer and the third raw materials are used for the substrate toughening layer;

S2) preparing a panel mold, calculating and weighing the first mixed material prepared in step S1 according to a thickness of the surface layer and uniformly arranging the first mixed material in the panel mold, calculating and weighing the second mixed material prepared in step S1 according to a thickness of the intermediate metal fiber toughening layer and uniformly arranging the second mixed material on the first mixed material in the panel mold, and then calculating and weighing the third mixed material prepared in step S1 according to a thickness of the substrate toughening layer and uniformly arranging the third mixed material on the second mixed material in the panel mold;

S3) covering an isolation moisturizing film on the third mixed material in the panel mold of step S2, and then putting the panel mold into a vacuum-press to concurrently perform a vacuum exhaust and a vibrating compression to obtain a compressed plate;

S4) curing the compressed plate obtained in step S3 at a temperature of 40° C. for 6-8 hours, then heating the compressed plate to 80-90° C. and curing the compressed plate at 80-90° C. for 12-16 hours to obtain a rough plate; and S5) performing a bottom scraping, a thickening and a polishing on the rough plate obtained in step S4 after removing the isolation moisturizing film to obtain the high toughness inorganic composite artificial stone panel.

7. The preparation method of the high toughness inorganic composite artificial of claim 6, wherein in step S1, time for the stirring and mixing the first raw materials, the second raw materials, and the third raw materials is not less than 10 minutes, respectively, Vebe consistometer test time of the first mixed material, the second mixed material, and the third mixed material is 5-30 seconds, respectively; and initial setting time of the first mixed material, the second mixed material, and the third mixed material after the stirring and mixing is not less than 60 minutes.

8. The preparation method of claim 6, wherein in step S3, and time for the vacuum exhaust is not less than 60 seconds, time for the vibrating compression is not less than 120 seconds; and a vacuum pressure for the vacuum exhaust is −0.07-0.1 MPa, a pressure load of the vacuum-press is not less than 1 MPa, and a pressure of the vacuum-press is not less than 5000 kN.

9. The preparation method of claim 6, wherein in step S4, a humidity is kept above 75% during the curing at 80-90° C.

10. The preparation method of claim 6, wherein the inorganic active powder is mainly composed of pure white Portland cement doped with active powder, the pure white Portland cement has a strength grade of more than 42.5, and the active powder is at least one selected from the group consisting of white silicon powder, mineral powder, nano calcium oxide, nano silicon oxide, and sintered high white kaolin powder.

11. The preparation method of claim 6, wherein the sand is at least one selected from the group consisting of river sand, manufactured sand, and the quartz sand.

12. The preparation method composite artificial of claim 6, wherein the toughening agent is at least one selected from the group consisting of polyvinyl alcohol glue and acrylamide glue.

13. The preparation method composite artificial of claim 6, wherein an overall thickness of the high toughness inorganic composite artificial stone panel is 15-50 mm, a thickness of the surface layer is 3-5 mm, and a thickness of the substrate toughening layer is 3-5 mm.

* * * * *